(12) United States Patent
Schuessler et al.

(10) Patent No.: US 11,192,423 B2
(45) Date of Patent: Dec. 7, 2021

(54) STABILIZER BAR ADHESIVE MOUNT FOR A VEHICLE STABILIZER BAR, VEHICLE STABILIZER BAR HAVING A STABILIZER BAR ADHESIVE MOUNT, AND METHOD FOR FORMING A STABILIZER BAR ADHESIVE MOUNT ON A VEHICLE STABILIZER BAR

(71) Applicants: THYSSENKRUPP FEDERN UND STABILISATOREN GMBH, Hagen (DE); thyssenkrupp AG, Essen (DE)

(72) Inventors: Daniel Schuessler, San Luis Potosi (MX); Dieter Lechner, Düsseldorf (DE); Frank Schneider, Dortmund (DE); Angel Chong, San Luis Potosi (MX); Valeri Becker, Schotten (DE); Artur Kerbs, Hammersbach (DE); Joerg Ditzel, Freigericht (DE)

(73) Assignees: THYSSENKRUPP FEDERN UND STABILISATOREN GMBH, Hagen (DE); THYSSENKRUPP AG, Essen (DE)

(*) Notice: Subject to any disclaimer, the term of this patent is extended or adjusted under 35 U.S.C. 154(b) by 66 days.

(21) Appl. No.: 16/619,009

(22) PCT Filed: Jun. 13, 2018

(86) PCT No.: PCT/EP2018/065671
§ 371 (c)(1),
(2) Date: Dec. 3, 2019

(87) PCT Pub. No.: WO2018/229135
PCT Pub. Date: Dec. 20, 2018

(65) Prior Publication Data
US 2021/0078377 A1   Mar. 18, 2021

(30) Foreign Application Priority Data

Jun. 14, 2017 (DE) .................... 10 2017 210 022.2
Aug. 25, 2017 (DE) .................... 10 2017 214 947.7

(51) Int. Cl.
*B60G 21/055*       (2006.01)
*B29C 65/48*        (2006.01)
(Continued)

(52) U.S. Cl.
CPC ........ *B60G 21/0551* (2013.01); *B29C 65/484* (2013.01); *B29C 66/1122* (2013.01);
(Continued)

(58) Field of Classification Search
CPC .......... B60G 21/0551; B60G 2204/122; B60G 2204/1222; B60G 2204/41;
(Continued)

(56) References Cited

U.S. PATENT DOCUMENTS 5,588,209 A      12/1996  Fisher
2004/0070161 A1  4/2004   Fader
(Continued)

FOREIGN PATENT DOCUMENTS

CN   110195754 A  *  9/2019  ............ F16F 1/3732
DE   199 45 044 A    5/2000
(Continued)

OTHER PUBLICATIONS

Description Translation for JP 2010137688 from Espacenet (Year: 2010).*

(Continued)

*Primary Examiner* — James A English
*Assistant Examiner* — Daniel M. Keck
(74) *Attorney, Agent, or Firm* — thyssenkrupp North America, LLC

(57) ABSTRACT

A stabilizer adhesive bearing for a vehicle stabilizer may comprise an annular sleeve having a resilient inner contour (Continued)

for coaxial arrangement on the vehicle stabilizer. The resilient inner contour of the annular sleeve may comprise on a side facing the vehicle stabilizer a three-dimensionally structured surface with an adhesive receiving volume. The three-dimensionally structured surface has a maximum roughness depth ($R_{max}$) greater than 45 μm and a core roughness depth ($R_K$) of at least 65% relative to the maximum roughness depth ($R_{max}$) of the three-dimensionally structured surface. The maximum roughness depth ($R_{max}$) is a total of the reduced tip height ($R_{pk}$), the core roughness depth ($R_K$), and the reduced groove depth ($R_{vk}$). Further, the reduced tip height ($R_{pk}$), the reduced groove depth ($R_{vk}$), and the core roughness depth ($R_K$) may be determined in accordance with EN ISO 13565-2: December 1997.

12 Claims, 1 Drawing Sheet

(51) Int. Cl.

| | | |
|---|---|---|
| *B29C 65/00* | (2006.01) | |
| *F16C 17/02* | (2006.01) | |
| *F16F 1/373* | (2006.01) | |
| *F16F 1/16* | (2006.01) | |
| *B29L 31/30* | (2006.01) | |

(52) U.S. Cl.
CPC .......... *F16C 17/022* (2013.01); *F16F 1/3732* (2013.01); *B29L 2031/30* (2013.01); *B60G 2204/122* (2013.01); *B60G 2204/41* (2013.01); *B60G 2206/73* (2013.01); *B60G 2206/821* (2013.01); *F16F 1/16* (2013.01); *F16F 2224/025* (2013.01); *F16F 2226/042* (2013.01); *F16F 2228/007* (2013.01); *F16F 2230/30* (2013.01); *F16F 2234/02* (2013.01)

(58) Field of Classification Search
CPC .......... B60G 2206/73; B60G 2206/821; B29C 65/48; B29C 65/484; B29C 66/1122; B29C 2031/30; B29C 66/5324; B29C 66/53241; B29C 66/71; B29C 66/30322; F16C 17/022; F16F 1/3732; F16F 1/16; F16F 2224/025; F16F 2226/042; F16F 2228/007; F16F 2230/30; F16F 2234/02; B29L 2031/774; B29L 2031/721

See application file for complete search history.

(56) References Cited

U.S. PATENT DOCUMENTS

| | | |
|---|---|---|
| 2007/0068407 A1 | 3/2007 | Schmitt |
| 2013/0270787 A1 | 10/2013 | Suwa |
| 2016/0257178 A1 | 9/2016 | Higuchi |
| 2017/0312988 A1 | 11/2017 | Kuroda |
| 2018/0056747 A1* | 3/2018 | Lechner ............... F16C 33/046 |
| 2018/0134109 A1* | 5/2018 | Saihara ............... B29C 66/8286 |
| 2018/0272828 A1 | 9/2018 | Umeno et al. |

FOREIGN PATENT DOCUMENTS

| | | | |
|---|---|---|---|
| DE | 10 2013 001 898 A | | 8/2014 |
| EP | 2 650 150 A | | 10/2013 |
| JP | S63167128 A | | 7/1988 |
| JP | H02018178 A | | 1/1990 |
| JP | 2001270315 A | | 10/2001 |
| JP | 2006008082 A | | 1/2006 |
| JP | 2007091474 A | | 4/2007 |
| JP | 2008081116 A | | 4/2008 |
| JP | 2010006337 A | | 1/2010 |
| JP | 2010137688 A | | 6/2010 |
| JP | 2010137688 A | * | 6/2010 |
| JP | 2012121414 A | | 6/2012 |
| JP | 2016084072 A | | 5/2016 |
| JP | 2017100587 A | | 6/2017 |
| WO | 2016/031536 A | | 3/2016 |

OTHER PUBLICATIONS

Din En Iso 13565-2, GPS—Surface texture: Profile method—Surfaces having stratified functional properties, Part 2: Height characterization using the linear material ratio curve, Apr. 1998, pp. 1-9.
English Translation of International Search Report issued in PCT/EP2018/065671, dated Aug. 29, 2018 (dated Sep. 6, 2018).
Din En Iso 13565-2: Apr. 1998. [in process of locating copy].
En Iso 13565-2: Dec. 1997. [in process of locating copy].

* cited by examiner

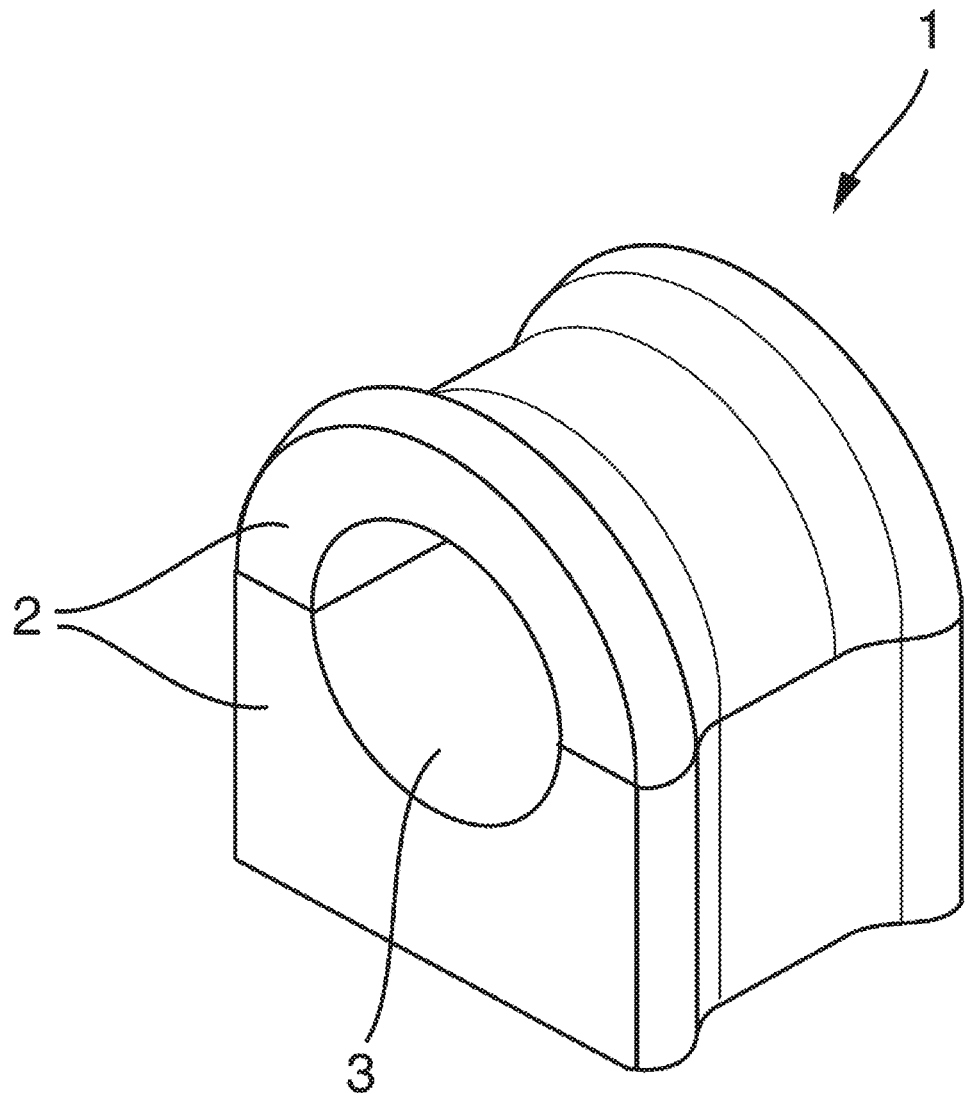

STABILIZER BAR ADHESIVE MOUNT FOR A VEHICLE STABILIZER BAR, VEHICLE STABILIZER BAR HAVING A STABILIZER BAR ADHESIVE MOUNT, AND METHOD FOR FORMING A STABILIZER BAR ADHESIVE MOUNT ON A VEHICLE STABILIZER BAR

CROSS REFERENCE TO RELATED APPLICATIONS

This application is a U.S. National Stage Entry of International Patent Application Serial Number PCT/EP2018/065671, filed Jun. 13, 2018, which claims priority to German Patent Application No. DE 10 2017 214 947.7, filed Aug. 25, 2017, and German Patent Application No. DE 10 2017 210 022.2, filed Jun. 14, 2017, the entire content of all of which are incorporated herein by reference.

FIELD

The present disclosure generally relates to stabilizer adhesive bearings for vehicle stabilizers and methods for forming stabilizer adhesive bearings on vehicle stabilizers.

BACKGROUND

A large number of embodiments of vehicle stabilizers for motor vehicles are known in the prior art and are, for example, also referred to as stabilizers, stabilizer torsion bars or torsion bars. These stabilizing torsion bars serve to stabilize against inclination and distortion of the body, particularly during travel by a motor vehicle round bends, journeys of a motor vehicle over changing roadway surfaces and in the case of surface unevenness. Such stabilizers are generally arranged in the region of the front axle and rear axle and generally extend over the entire width of the vehicle. The fixing of such stabilizers to the chassis, on the one hand, and the body, on the other hand, involves the problem that the vibrations, oscillations and noises which arrive at, occur at and/or are received by the body, such as, for example, wheel and roadway noise, are transmitted to the body and consequently also into the passenger compartment via the fixing. In order to damp this transmission, in particular to reduce it, the stabilizers are generally fixed with stabilizer bearings in a damping manner. These stabilizer bearings are also known in the prior art as sleeve bearings which have a rigid outer sleeve, also referred to as an annular sleeve, and a resilient inner contour which is arranged coaxially in this annular sleeve. It is also known to arrange a resilient inner contour on a stabilizer bar, wherein the stabilizer bar is fixed to a vehicle bottom via the resilient inner contour which is arranged thereon, in particular with a clip. There is generally a rigid outer device which is fixed to a vehicle bottom, wherein inside this outer device a resilient inner contour which is arranged coaxially around a stabilizer. These above-mentioned bearings can be distinguished with respect to the function thereof as sliding bearings, clamping bearings, adhesive bearings and bonding bearings. When using sliding bearings, the stabilizer can be displaced freely in a torsional and axial direction counter to a small friction force. In order to axially secure the component, in this case additional arrangements are made. Clamping bearings produce a clamping connection with respect to the stabilizer and have in a non-tensioned state a smaller inner diameter in comparison with the outer diameter of the stabilizer on which the clamping bearing is arranged. Usually, clamping bearings are pretensioned during the assembly on a stabilizer and are then arranged on the stabilizer. Clamping bearings can further have a coaxial inner sleeve. Adhesive bearings produce an adhesive connection with respect to the stabilizer by an adhesive system being applied, wherein the resilient inner contour bonds at least partially to the covering face of the stabilizer, on which the adhesive bearing is arranged. In order to bond the adhesive bearing which is arranged on the stabilizer, there are known in the prior art a large number of adhesive systems, in particular comprising a primer and a cover. Adhesive bearings produce an adhesive connection with respect to the stabilizer when an adhesive composition is applied, wherein the resilient inner contour is adhesively bonded at least partially to the covering face of the stabilizer on which the adhesive bearing is arranged. In order to bond the adhesive bearing which is arranged on the stabilizer, there are known in the prior art a large number of adhesive compositions and adhesive systems, in particular comprising two-component systems with binders and curing agents. A significant difference between adhesive bearings and bonding bearings is that the adhesive bonding of the bonding bearings can be carried out at substantially lower temperatures and thereby a reduction of the process costs is enabled.

A large number of arrangements and possible fixing methods, which do not change the basic function of the stabilizer bearing, are known in the prior art for fixing the stabilizer bearings to the chassis and the body. For example, a stabilizer bearing having a bearing shell or a clip can be fixed to the chassis and/or the body.

DE 10 2013 001 898 A1 discloses a stabilizer adhesive bearing having a resilient inner contour. The present disclosure generally concerns an improved vehicle stabilizer and/or a stabilizer adhesive bearing and an improved method for forming a stabilizer adhesive bearing on a vehicle stabilizer. In particular, it is intended to be possible with this improved vehicle stabilizer and/or stabilizer adhesive bearing and the improved method to form a stabilizer adhesive bearing on a vehicle stabilizer, to reduce relative movements which occur during operation of the stabilizer between the stabilizer and the stabilizer adhesive bearing and to achieve improved driving dynamics. Furthermore, a stabilizer adhesive bearing is intended to be provided which at least partially unifies the advantages of a clamping bearing and those of an adhesive bearing. Furthermore, the production of an at least partial adhesive connection between a stabilizer and an adhesive bearing which is arranged thereon is intended to be carried out in quicker times and/or at lower process temperatures in comparison with adhesive bearings and/or bonding bearings according to the prior art, which affords the advantage of lower energy consumption of the process. Furthermore, an adhesive connection of the stabilizer adhesive bearing on the stabilizer is intended to be ensured with pretensioning without cracks on the stabilizer adhesive bearing. Furthermore, a stable production process for adhesively bonding stabilizer adhesive bearings to a stabilizer is intended to be provided with the improved method for producing a stabilizer comprising a stabilizer adhesive bearing. Furthermore, the improved method for producing the stabilizer comprising a stabilizer adhesive bearing is intended to be able to be implemented simply and reliably in methods which already exist.

BRIEF DESCRIPTION OF THE FIGURES

FIG. 1 is a schematic perspective view of an example stabilizer adhesive bearing in a non-tensioned state.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The stabilizer according to the invention for vehicles, in particular comprising at least one stabilizer adhesive bearing, has the advantage in comparison with conventional stabilizers that the properties of a clamping bearing are at least partially unified with those of an adhesive bearing.

The method according to the invention for forming a stabilizer adhesive bearing, in particular for producing torsion bar shoulder bearings for vehicles, has the advantage with respect to conventional methods that it can be carried out in shorter times and/or at lower process temperatures, which affords the advantage of lower energy consumption of the process. Another advantage of the method according to the invention is that it can be integrated simply and reliably into methods which already exist.

Therefore, the invention relates to a stabilizer adhesive bearing for a vehicle stabilizer, wherein the stabilizer adhesive bearing comprises at least one annular sleeve having a resilient inner contour for coaxial arrangement on the vehicle stabilizer, wherein the resilient inner contour of the at least one annular sleeve comprises at least on the side facing the vehicle stabilizer a three-dimensionally structured surface with an adhesive receiving volume, wherein the three-dimensionally structured surface has a maximum roughness depth ($R_{max}$) greater than 45 μm and a core roughness depth ($R_K$) of at least 65% relative to the maximum roughness depth ($R_{max}$) of the three-dimensionally structured surface, wherein the maximum roughness depth ($R_{max}$) is the total of the reduced tip height ($R_{pk}$), the core roughness depth ($R_K$), and the reduced groove depth ($R_{vk}$), wherein the reduced tip height ($R_{pk}$), the reduced groove depth ($R_{vk}$) and the core roughness depth ($R_K$) are determined in accordance with EN ISO 13565-2: December 1997.

Another aspect of subject-matter of the invention is a method for forming a stabilizer adhesive bearing on a vehicle stabilizer, in particular for producing torsion rod shoulder bearings for motor vehicles, comprising the steps of:

a) providing a stabilizer having a covering face for arranging a stabilizer adhesive bearing;
b) providing the stabilizer adhesive bearing comprising at least one annular sleeve having a resilient inner contour at least on the side which faces the vehicle stabilizer, wherein the resilient inner contour comprises a three-dimensionally structured surface having an adhesive receiving volume, wherein the three-dimensionally structured surface has a maximum roughness depth ($R_{max}$) greater than 45 μm and a core roughness depth ($R_K$) of at least 65% relative to the maximum roughness depth ($R_{max}$) of the three-dimensionally structured surface, wherein the maximum roughness depth ($R_{max}$) is the total of the reduced tip height ($R_{pk}$), the core roughness depth ($R_K$), and the reduced groove depth ($R_{vk}$), wherein the reduced tip height ($R_{pk}$), the reduced groove depth ($R_{vk}$) and the core roughness depth ($R_K$) are determined in accordance with EN ISO 13565-2: December 1997;
c) providing at least one assembly device;
d) providing at least one adhesive composition;
e) at least partially pretreating the three-dimensionally structured surface of the stabilizer adhesive bearing which is provided in step b) and/or the covering face for arranging the stabilizer adhesive bearing of the stabilizer which is provided in step a) with the at least one adhesive composition which is provided in step d);
f) arranging the at least one stabilizer adhesive bearing which is provided in step b) or which is at least partially pretreated in step e) in the at least one assembly device which is provided in step c);
g) arranging the stabilizer which is provided in step a) in the stabilizer adhesive bearing in the assembly device which is arranged in step f) so as to produce an at least partial adhesive connection between the three-dimensionally structured surface which is at least partially pretreated in step e) and/or the covering face which is at least partially pretreated in step e).

Another aspect of subject-matter of the invention is a vehicle stabilizer comprising at least one coaxially arranged having at least one annular sleeve having a resilient inner contour.

Another aspect of subject-matter of the invention is a vehicle stabilizer comprising at least one coaxially arranged stabilizer adhesive bearing which is formed according to the method according to the invention.

The invention can be carried out in the stabilizer adhesive bearing, in a vehicle stabilizer and in methods for forming a stabilizer adhesive bearing.

A stabilizer is also intended to be understood in the context of the invention to be a stabilization torsion bar. In particular, portions of stabilizers and/or divided stabilizers are intended to be understood to be stabilizers according to the invention.

The term "stabilizer adhesive bearing" is intended to be understood in the context of the present invention to be a stabilizer bearing, in particular a torsion bar bearing, which can be arranged on the stabilizer, in particular the torsion bar, with an adhesive connection.

The term "annular sleeve" is intended to be understood in the context of the present invention to be a sleeve which can be arranged annularly around a stabilizer and which has at least one opening, in particular a slot opening, via which the sleeve can be arranged on a stabilizer. In particular, an annular sleeve may have two annular openings and may consequently comprise two portions. For example, a segmented sleeve which comprises two or more portions is also an embodiment according to the invention.

In the context of the present invention, the term "resilient inner contour" is intended to be understood to be the inner contour of an annular sleeve which can be resiliently deformed during tensile and/or pressure loading, in particular during application of a pretension, and which is orientated back into the original shape again without the tensile and/or pressure loading. For example, resilient inner contours according to the invention comprising a material composition are selected from a group of completely or partially vulcanized elastomer materials, in particular natural rubber, poly(1,4-cis-isoprene), poly(1,4-trans-isoprene), synthetic rubbers, in particular ethylene-propylene rubbers, ethylene-propylene-diene rubbers, butyl rubbers, silicone rubbers, butadiene and/or the mixed polymerisates thereof, rubber, polyurethane, thermoplastic elastomer materials, in particular thermoplastic elastomer materials based on olefins, cross-linked thermoplastic elastomer materials based on olefins, thermoplastic elastomer materials based on urethane, thermoplastic polyester elastomer materials, thermoplastic copolyester, styrene block copolymers, thermoplastic copolyamides and combinations thereof.

The roughness profile of the three-dimensionally structured surface may have a maximum roughness depth ($R_{max}$) equal to a sum of the reduced tip height ($R_{pk}$), the reduced groove depth ($R_{vk}$), and the core roughness depth ($R_K$), which are in turn calculated in accordance with EN ISO 13565-2: December 1997. The roughness profile is established by the three-dimensionally structured surface being measured in at least four rectilinear measurement directions over a minimum measurement length ($L_N$) of at least 15 mm for each of the rectilinear measurement directions which differ from each other by 45°, respectively. In particular, the measuring device MarSurf CWM 100 with sub-nanometer resolution of the company Mahr GmbH with registered offices in Göttingen, Germany, can be used for measuring the roughness profile of the three-dimensionally structured surface and the topology software MarSurf MfM/MfMplus of the company Mahr GmbH with registered offices in Göttingen, Germany, can be used for evaluating the measured roughness profile in accordance with EN ISO 13565-2: December 1997.

The term "adhesive" is intended to be understood to refer to compositions which form an adhesive connection, in particular after a curing operation, between a stabilizer and a stabilizer adhesive bearing which is arranged on the stabilizer.

In the context of the present invention, the term "adhesive receiving volume" is intended to be understood to refer to a volume for receiving adhesive, in particular an adhesive composition. For example, a surface, in particular a three-dimensionally structured surface of a resilient inner contour, may have recesses which provide an adhesive receiving volume. In particular, surface recesses may have adhesive.

In the context of the present invention, the terms reduced tip height ($R_{pk}$), reduced groove depth ($R_{vk}$) and core roughness depth ($R_K$) are intended to be understood in accordance with EN ISO 13565-2: December 1997. ISO 13565-2: December 1997 is a constituent part of the disclosure of the present invention.

In a preferred embodiment of the invention, the stabilizer adhesive bearing further comprises at least one annular sleeve in a longitudinal direction of the vehicle stabilizer at least a first sealing element which is arranged at one end of the at least one annular sleeve and at least one additional sealing element which is arranged at the other end of the at least one annular sleeve.

In the context of the present invention, the term "sealing element" is intended to be understood to refer to an element for retaining adhesive which is arranged on the annular sleeve, particularly at the end. For example, sealing elements are selected from a group of sealing lips, sealing strips, sealing rings, sealing wedges, sealing joints or a combination thereof.

In a preferred embodiment, the sequence of the steps e) to f) of the method according to the invention may be freely selected.

In a preferred embodiment of the method according to the invention, the arrangement in step f) is carried out with pretensioning of the at least one stabilizer adhesive bearing.

In the context of the present invention, an assembly device is intended to be understood to be a device with which a stabilizer adhesive bearing is arranged on a stabilizer. In particular, an assembly device is selected from a group of a clip, a curved fixing member, an annular bracket, a quench, a vehicle clip, a clip bearing composite component or a combination thereof. For example, the term "assembly device" may also be understood to be a clamping device, that is to say, a device with which an annular sleeve which is arranged in the clamping device can be acted on with a pressure. Examples of a clamping device are clamping tools, clips, clamps or combinations thereof.

In the context of the present invention, the term "pretension" is intended to be understood to mean when a force which is greater than the weight force of a stabilizer adhesive bearing which is arranged on a stabilizer is applied. In particular, the distribution of the adhesive composition between the three-dimensionally structured surface of the stabilizer adhesive bearing and the stabilizer is carried out with the application of a pretension. For example, a pretension can also be carried out when the stabilizer, on which a stabilizer adhesive bearing is arranged, has a greater outer diameter in relation to the inner diameter of the stabilizer adhesive bearing in the state not arranged thereon. This is also referred to in the prior art as an overlap.

The application of a stabilizer adhesive bearing according to the invention is generally carried out on a stabilizer according to the invention which has an at least partially coated surface. In the context of the present invention, the term "coated surface" is intended to be understood to be the application of an adhesively bonded coating comprising an amorphous composition at least partially to the surface of the stabilizer according to the invention. The coated surface may, for example, be selected in accordance with the coating method from the group of painting, in particular spray painting, injection painting, immersion painting, hot dipping, powder coating, enameling, curtain application, coating application, flame coating and combinations thereof. Consequently, the stabilizer according to the invention comprises a coated surface.

In the context of the present invention, the term "adhesive composition" is intended to be understood to be a composition in which the curing process, in particular the polymerization, is initiated by moisture, such as, for example, air humidity. For example, the adhesive composition comprises the group of (poly)cyanoacrylate, in particular methyl cyanoacrylate, ethyl cyanoacrylate or combinations thereof.

In a preferred embodiment of the method according to the invention, the production of the at least partial adhesive connection in step g) is carried out within less than 120 sec., preferably less than 90 sec., particularly preferably less than 60 sec., very particularly preferably less than 30 sec.

In another embodiment, the production of the at least partial adhesive connection in step g) is carried out without any supply of reaction temperature, in particular without an additional heating step. In particular, the term "supply of reaction temperature" is intended to be understood to mean that a heat supply is carried out in the region of the adhesive connection, for example, with a hot air blower, an infrared radiator, a UV lamp, an induction device, a conductive heating device, a gas or electric oven, or combinations thereof and/or the heat is from an upstream process, for example, from a painting process.

In a preferred embodiment of the invention, in an additional step h) the stabilizer adhesive bearing which is arranged in step g) on the stabilizer while producing at least one adhesive connection is removed from the at least one clamping device.

Stabilizer adhesive bearings and vehicle stabilizers comprising at least one coaxially arranged stabilizer adhesive bearing of the type described above are used in the production of motor vehicles, in particular of chassis of the motor vehicles.

LIST OF REFERENCE NUMERALS

1=Stabilizer adhesive bearing
2=Annular sleeve
3=Three-dimensionally structured surface

What is claimed is:

1. A stabilizer adhesive bearing for a vehicle stabilizer, the stabilizer adhesive bearing comprising an annular sleeve having a resilient inner contour for coaxial arrangement on the vehicle stabilizer, wherein the resilient inner contour comprises on a side facing the vehicle stabilizer a three-dimensionally structured surface with an adhesive receiving volume, wherein the three-dimensionally structured surface has a maximum roughness depth greater than 45 μm and a core roughness depth of at least 65% relative to the maximum roughness depth of the three-dimensionally structured surface, wherein the maximum roughness depth is a total of a reduced tip height, the core roughness depth, and a reduced groove depth, wherein the reduced tip height, the reduced groove depth, and the core roughness depth are determined in accordance with EN ISO 13565-2: December 1997.

2. The stabilizer adhesive bearing of claim 1 wherein the annular sleeve comprises in a longitudinal direction of the vehicle stabilizer a first sealing element that is disposed at a first end of the annular sleeve and a second sealing element that is disposed at a second end of the annular sleeve.

3. A method for forming the stabilizer adhesive bearing of claim 1, the method comprising steps of:
   (a) providing the vehicle stabilizer having a covering face for arranging the stabilizer adhesive bearing;
   (b) providing the stabilizer adhesive bearing comprising the annular sleeve with the resilient inner contour on the side facing the vehicle stabilizer;
   (c) providing an assembly device;
   (d) providing an adhesive composition;
   (e) at least partially pretreating at least one of the three-dimensionally structured surface or the covering face with the adhesive composition;
   (f) positioning the stabilizer adhesive bearing in the assembly device; and
   (g) positioning the vehicle stabilizer in or on the stabilizer adhesive bearing in the assembly device to produce an at least partial adhesive connection between the three-dimensionally structured surface and/or the covering face.

4. The method of claim 3 for producing a torsion rod shoulder bearing for a motor vehicle.

5. The method of claim 3 wherein a sequence of steps (e) to (f) are freely selectable.

6. The method of claim 3 wherein the positioning in step (f) is performed with pretensioning of the stabilizer adhesive bearing.

7. The method of claim 3 wherein the production of the at least partial adhesive connection in step (g) is performed in less than 120 seconds.

8. The method of claim 3 wherein the production of the at least partial adhesive connection in step (g) is performed in less than 30 seconds.

9. The method of claim 3 wherein the production of the at least partial adhesive connection in step (g) is performed without any supply of a reaction temperature.

10. The method of claim 3 comprising:
    (h) removing the stabilizer adhesive bearing from the assembly device.

11. A vehicle stabilizer comprising a coaxially-arranged stabilizer adhesive bearing that comprises an annular sleeve having a resilient inner contour for coaxial arrangement on the vehicle stabilizer, wherein the resilient inner contour comprises on a side facing the vehicle stabilizer a three-dimensionally structured surface with an adhesive receiving volume, wherein the three-dimensionally structured surface has a maximum roughness depth greater than 45 μm and a core roughness depth of at least 65% relative to the maximum roughness depth of the three-dimensionally structured surface, wherein the maximum roughness depth is a total of a reduced tip height, the core roughness depth, and a reduced groove depth, wherein the reduced tip height, the reduced groove depth, and the core roughness depth are determined in accordance with EN ISO 13565-2: December 1997.

12. The vehicle stabilizer of claim 11, wherein the vehicle stabilizer is formed by a method comprising steps of:
    (a) providing the vehicle stabilizer having a covering face for arranging the stabilizer adhesive bearing;
    (b) providing the stabilizer adhesive bearing comprising the annular sleeve with the resilient inner contour on the side facing the vehicle stabilizer;
    (c) providing an assembly device;
    (d) providing an adhesive composition;
    (e) at least partially pretreating at least one of the three-dimensionally structured surface or the covering face with the adhesive composition;
    (f) positioning the stabilizer adhesive bearing in the assembly device; and
    (g) positioning the vehicle stabilizer in or on the stabilizer adhesive bearing in the assembly device to produce an at least partial adhesive connection between the three-dimensionally structured surface and/or the covering face.

* * * * *